United States Patent
Morgan

(10) Patent No.: US 9,053,501 B2
(45) Date of Patent: Jun. 9, 2015

(54) SPONTANEOUS SHARING OF MEDIA ASSET REFERENCES

(75) Inventor: Jeffrey A Morgan, Cupertino, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2774 days.

(21) Appl. No.: 10/979,014

(22) Filed: Oct. 31, 2004

(65) Prior Publication Data

US 2006/0095337 A1    May 4, 2006

(51) Int. Cl.
- *G06F 21/00* (2013.01)
- *G06Q 30/06* (2012.01)
- *G06Q 30/02* (2012.01)

(52) U.S. Cl.
CPC .............. *G06Q 30/06* (2013.01); *G06Q 30/02* (2013.01); *G06Q 30/0601* (2013.01)

(58) Field of Classification Search
USPC ............................................... 705/14, 50–79
See application file for complete search history.

(56) References Cited

U.S. PATENT DOCUMENTS

| 6,434,535 | B1 * | 8/2002 | Kupka et al. ..................... 705/24 |
| 6,983,371 | B1 * | 1/2006 | Hurtado et al. ............... 713/189 |
| 2002/0120925 | A1 * | 8/2002 | Logan ................. 725/9 |
| 2003/0204592 | A1 * | 10/2003 | Crouse-Kemp et al. ...... 709/225 |
| 2005/0097052 | A1 * | 5/2005 | Systa et al. ...................... 705/51 |
| 2005/0122345 | A1 | 6/2005 | Kirn et al. |
| 2005/0267845 | A1 * | 12/2005 | Oh et al. ......................... 705/51 |

\* cited by examiner

*Primary Examiner* — Chrystina Zelaskiewicz
(74) *Attorney, Agent, or Firm* — Hewlett-Packard Patent Department

(57) ABSTRACT

A solution for spontaneous sharing between a sharer and a recipient device of a media asset reference for a media asset purchased through a media service by a user of the sharer device using a short-range wireless protocol is described. The reference includes a network resolvable identifier of a media service from which the media asset was purchased and an identifier of the media asset. The reference can also include the identity of the user who purchased and is sharing the reference thus allowing the media service to track distribution of its asset and provide an incentive based on sharing if desired when the recipient user sends a request for the media asset via the Internet to the media service including the media asset reference.

10 Claims, 7 Drawing Sheets

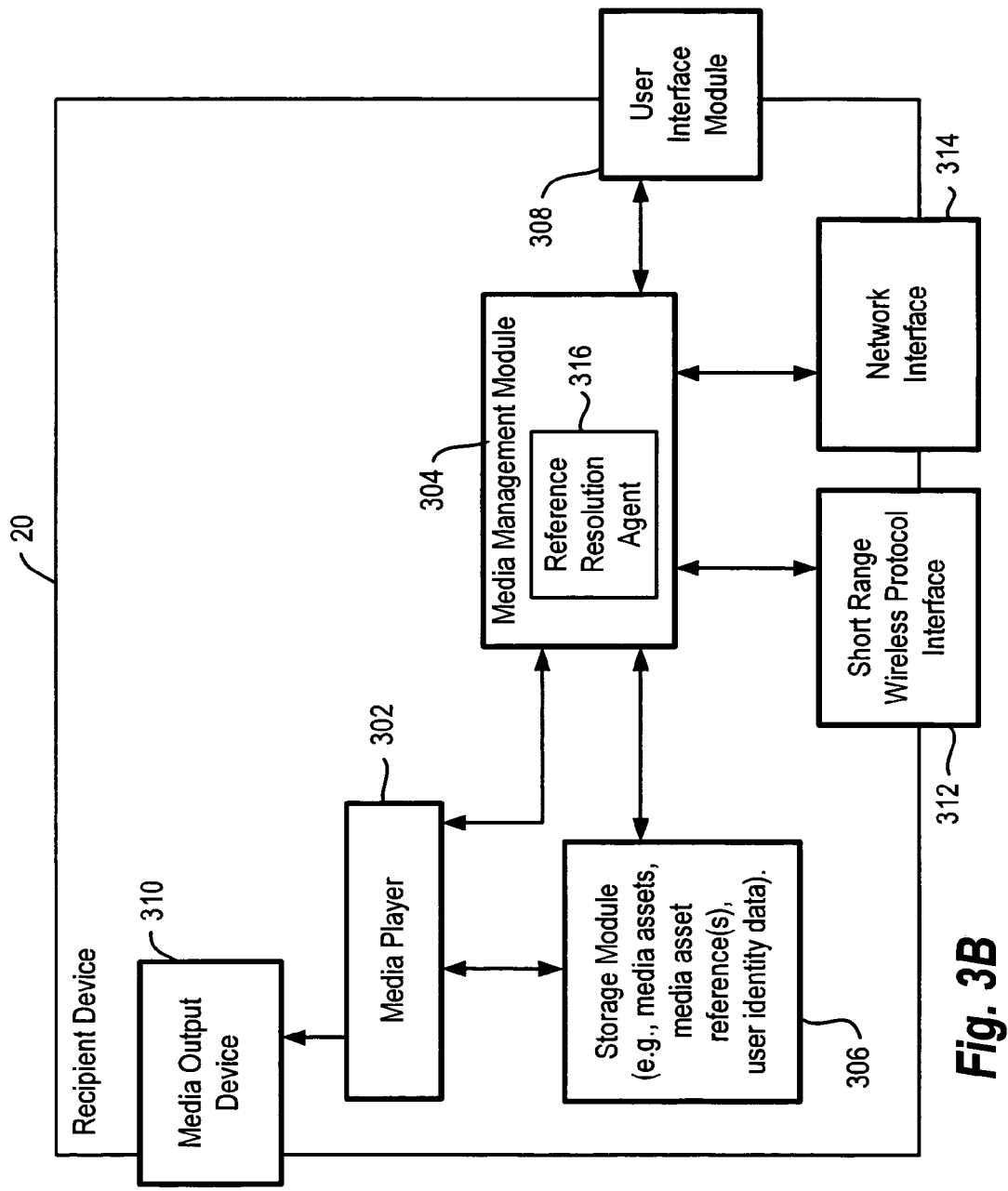

SPONTANEOUS SHARING OF MEDIA ASSET REFERENCES

CROSS-REFERENCE TO RELATED APPLICATION

This patent application is related to the U.S. patent application Ser. No. 10/978,544 entitled "High Resolution Image Management for Devices Using Low Bandwidth Communication," having inventor Jeffrey A. Morgan and filed concurrently with this application, and which is hereby incorporated by reference.

BACKGROUND

Field of Invention

The invention relates generally to tracking media distribution between handheld mobile devices.

A number of media services allow download of music, books and videos onto handheld or mobile devices. Many of these services offer a subscription model to clients that provide the rights to purchase, and the rights to play such media on the handheld or mobile devices. Some services such as the Apple iPod® allow clients to distribute a limited number of copies of a song or a playlist. However, generally, the media service desires that non-clients and other clients desiring a copy of a media asset after listening or seeing it via another user's device purchase the same media asset from its service from which the original owner purchased it. Furthermore, for sales enhancement and to discourage illegitimate distribution of media assets, it is desirable that the potential client receive at or near the time of the media experience the ability to access the media asset from the original provider even if the potential customer's device does not have Internet access at the time of the media experience.

SUMMARY OF INVENTION

The present invention provides one or more embodiments of solutions for spontaneous sharing of a media asset reference between devices. The media asset reference in accordance with one embodiment of the present invention comprises an identifier for a media service from which a sharer purchased a media asset and which is network resolvable and an identifier for the media asset for tracking by the media service. Additionally, the reference can include an identifier for the sharer of the reference. Optionally, the reference can also include a shorter sample version of the media asset, for example a clip of content from the media asset. The media asset reference can be transferred via a short range communication link between a sharer device and a recipient device.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3B is a functional block diagram of a system for spontaneous sharing of a media asset reference from the perspective of a recipient device in accordance with another embodiment of the present invention.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION OF THE DRAWINGS

Figure 1:
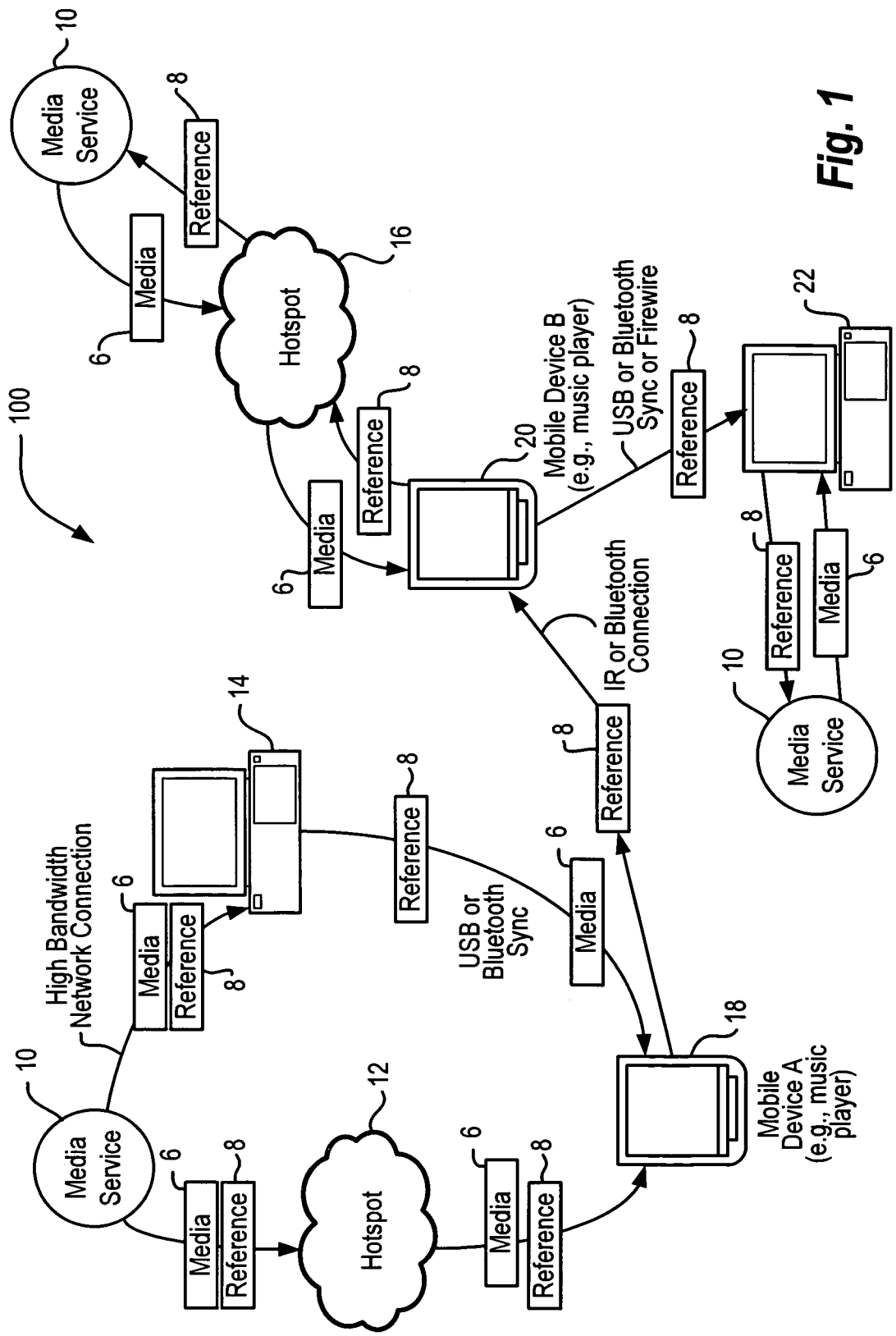
FIG. 1 is an architectural diagram of an example context in which one or more embodiments of a system for spontaneous sharing of a media asset reference can operate in accordance with an embodiment of the present invention.

FIG. 1 is an architectural diagram of an example context 100 in which one or more embodiments of a system for spontaneous sharing of a media asset reference can operate in accordance with an embodiment of the present invention. A handheld mobile device 18 (e.g., a music player) associated with User A (hereafter referred to as "mobile device A" for ease of description) can download media assets, for example digital audio tracks, from a media service 10 (e.g. iTunes®), which is typically web based, and play them based on a financial relationship (e.g., subscription) or financial transaction (e.g., payment) between User A and the media service 10. Mobile device A has a network interface through which it can connect to the media service 10 via a Hotspot 12 (e.g., 802.11 based wireless access point (WAP)) for downloads of a media asset 6 and its associated reference 8. In this example, mobile device A can also have a wired interface (e.g., Universal Serial Bus (USB) port or FireWire port) to a computer system 14 illustrated as a desktop personal computer 14 or docking station (not shown) which in turn has a network interface. The personal computer 14 acts as a proxy for mobile device A for downloads of a media asset 6 and its associated media asset reference 8 which the personal computer 14 downloads to mobile device A via a wired interface (e.g., USB or FireWire) or a wireless interface (e.g., Bluetooth or 802.11 type WAP). In this example, mobile device A includes a communication interface suitable for a short range wireless interface such as Infrared (IR) or Bluetooth through which it can communicate with a handheld mobile device 20 (e.g., another music player) associated with User B (hereafter referred to as "mobile device B"). Mobile device B in this example also has a network interface through which it can connect to the media service 10 via a Hotspot 16 and a wired interface (e.g., USB or FireWire) or wireless interface with a computer system, in this example also a personal desktop computer 22 through which it can access the media service 10 via a network interface.

Consider that User A encounters User B on an airplane and User B experiences a media asset 6 (e.g., a song, a video, an image or a content clip of a media asset) which User A purchased via the media service 10. User B wants a copy of the media asset 6, but the only communication path available to Users A or B is via their short range wireless protocol interfaces at the time of encounter. Responsive to input from User A, mobile device A transfers the media asset reference 8 to mobile device B during the flight. A software agent on both mobile devices mediates the transfer of this reference 8. User B can then use this reference 8 to gain access to the right to purchase its associated media asset from media service 10 when mobile device B has network access, for example via Hotspot 16 located in the airport terminal or later via an Internet connection with his home computer 22.

The media asset reference 8 in accordance with one embodiment of the present invention comprises an identifier for the media service from which User A purchased the media asset 6 and which is network resolvable, for example a Uniform Resource Identifier (URI), which a software agent on mobile device B can parse and resolve to access the media service 10. In addition, the media asset reference 8 includes an identifier for the media asset for tracking by the media service. This media asset identifier can be generated according to a scheme predetermined by the media service 10 such as a product code. In one example, the media asset identifier is encrypted so that only the service 10 can decrypt it to prevent hijacking by unauthorized or fraudulent web services. Additionally, the reference 8 can include an identifier for the sharer (e.g., User A) of the reference 8 which can also be generated according to a scheme predetermined by the media service 10 and also encrypted for security purposes. Optionally, the reference 8 can also include a shorter sample version of the media asset, for example a clip of content from the media asset. In one example, the information for the reference 8 is included within an Extensible Markup Language (XML) tag which can include the media service identifier as a URI and include the other information in attributes of the tag. The reference 8 can also be stored on a removable storage medium such as a card with a magnetic strip or a memory stick that can be removed and plugged into another device connected to the Internet for accessing the media service 10.

Figure 2:
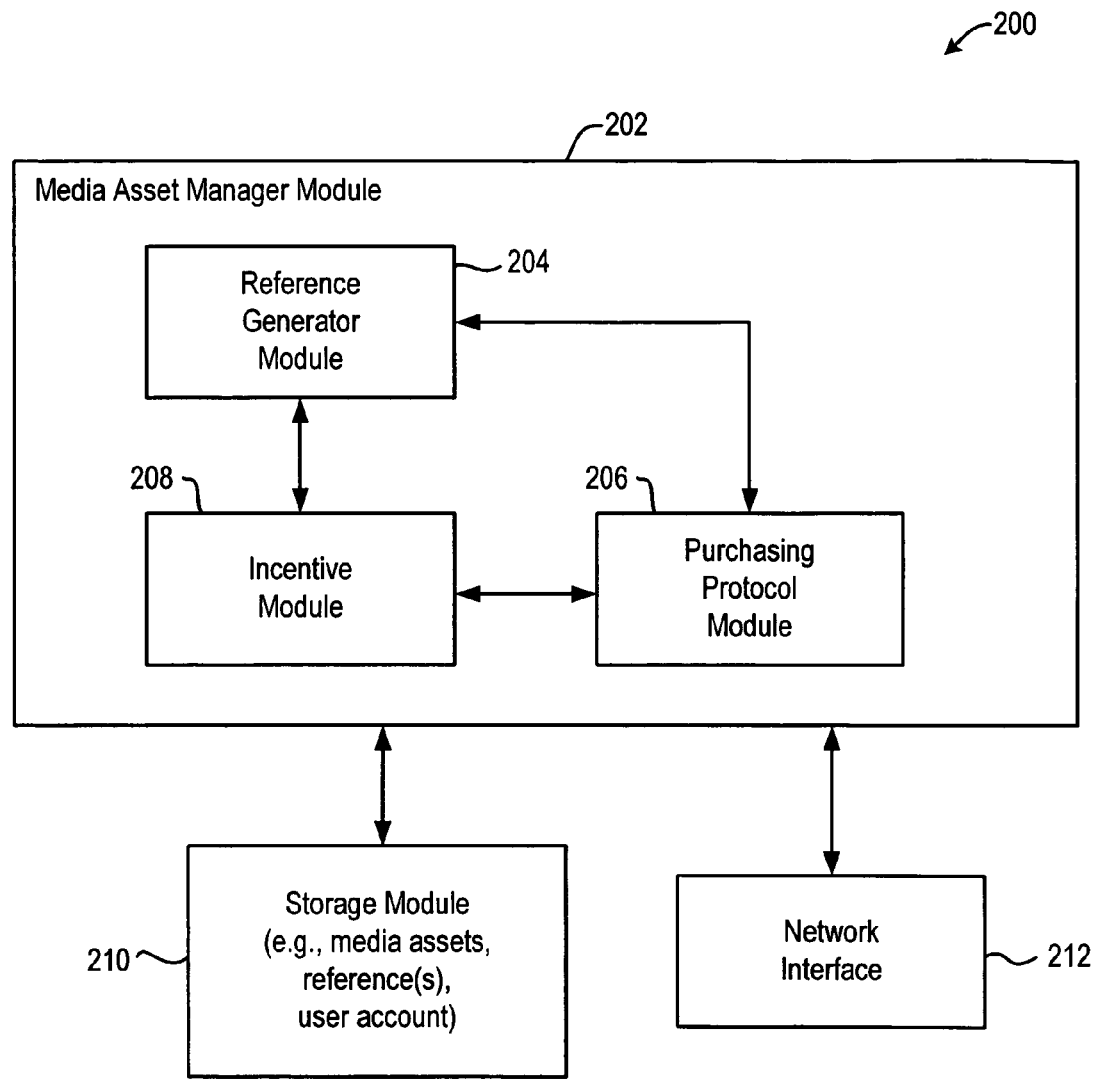
FIG. 2 is a functional block diagram of a system for managing a media asset reference from the perspective of a media service in accordance with an embodiment of the present invention.

FIG. 2 is a functional block diagram of a system 200 for managing a media asset reference from the perspective of a media service in accordance with an embodiment of the present invention. The system 200 comprises a media asset manager module 202 for controlling media asset management tasks which is communicatively coupled to a network interface 212 (e.g., an Internet connection) and a storage module 210 for storing media assets, media asset references and user account information. Examples of media asset management tasks are coordinating transfer of media with a purchaser, coordinating purchase, and tracking media assets. The media asset manager module 202 comprises a purchasing protocol module 206, a reference generator module 204 and an incentive module 208. The purchasing protocol module 206 communicates with a device using a purchasing protocol to complete a financial transaction for a media asset. The purchasing protocol module 206 is communicatively coupled to the reference generator module 204 and the incentive module 208. The purchasing module 206 can establish a user account for a new user of the media service prior to purchase or update the user's account for the financial transaction. Upon a successful financial transaction for a media asset, the purchasing protocol module 206 sends purchaser identifying information and a media asset identifier to the reference generator module 204 based upon which the reference generator module 204 creates a media asset reference.

The media asset reference in accordance with one embodiment of the present invention comprises an identifier for the media service which is network resolvable (e.g., URI), an identifier for the media asset for tracking by the media service. This media asset identifier can be generated according to a scheme predetermined by the media service 10 such as a product code. In one example, the media asset identifier is encrypted so that only the service 10 can decrypt it to prevent hijacking by unauthorized or fraudulent web services. Additionally, the media asset reference can include an identifier for the purchaser (e.g., User A) which can also be generated according to a scheme predetermined by the media service 10 and also encrypted for security purposes. Optionally, the reference can also include a shorter sample version of the media asset, for example a clip of content from the media asset. In one example, the reference generator module 204 can form a link by concatenating the media asset identifier with the URI for the media service in the reference.

The purchasing protocol module 206 notifies the incentive module 208 of the purchase including data identifying the user account(s) associated with the purchase and the media asset reference for the media asset sold. Based on this information, the incentive module 208 can perform incentive management tasks and update the associated user account(s) in the storage module 210. Some examples of incentive management tasks are linking the media asset reference generated in the purchase with the user's account information, awarding a credit to the user's account for a purchase made by another user using the media asset reference identifying this user in accordance with an incentive program, and sending notifications to the user regarding the incentive program.

Each of the modules illustrated in FIG. 2 or a portion thereof can be implemented in software suitable for execution on a processor and storage in a computer-usable medium, hardware, firmware or any combination of these. Computer-usable media include any configuration capable of storing programming, data, or other digital information. Examples of computer-usable media include various memory embodiments such as random access memory and read only memory, which can be fixed in a variety of forms, some examples of which are a hard disk, a disk, flash memory, or a memory stick.

Figure 3A:
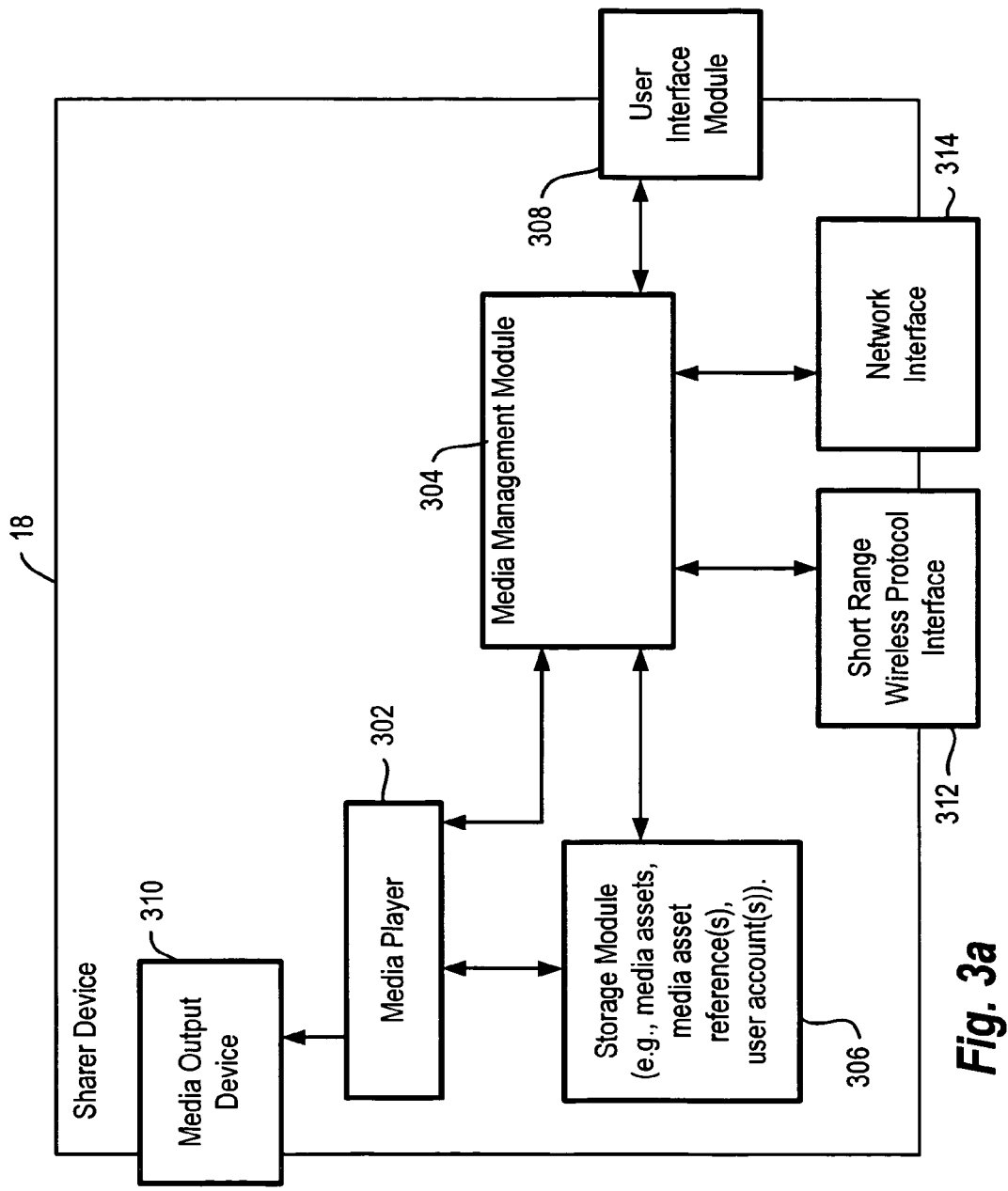
FIG. 3A is a functional block diagram of a system for spontaneous sharing of a media asset reference from the perspective of a sharer device in accordance with another embodiment of the present invention.

FIG. 3A is a functional block diagram of a system for spontaneous sharing of a media asset reference from the perspective of a sharer device 18 in accordance with another embodiment of the present invention. In this example, the sharer device is depicted as mobile device A as describe in FIG. 1 that is a media player. In other embodiments, the sharer device and/or the recipient device need not have media storage and/or media presentation (e.g. media player) capabilities. The system comprises a media management module 304 communicatively coupled to a network interface 314, a short range wireless protocol interface 312, and a storage module 306 for storing media assets, media asset reference(s), and user account information. The media management module 304 is also communicatively coupled to a user interface module 308 of the sharer device 18 which processes user input and output and a media player 302 which controls a media output device, some examples of which are a display and a speaker. The media management module 304 can participate in the purchasing protocol with the media service (e.g., 10) via the network interface 314. For example, the media management module 304 provides the user's account information stored in the storage module 306, upon completion of the transaction, the media management module 304 stores the media asset and media asset reference received via the network interface 314 from the media service, and notifies the user via the user interface 308 of the successful download of the asset and its reference. Responsive to user input requesting the playing of a media asset, the media management module 304 notifies the media player 302 which typically streams the media asset data from the storage module 306 to the media output device 310 for presentation. Responsive to user input from the user interface module 308 requesting a reference (e.g., 8) for a media asset (e.g., 6), the media management module 304 retrieves the requested media asset reference from the storage module 306 and sends the reference to another device via the short range wireless protocol interface 312. Alternatively, the media management module 304 can send the reference via the network interface 314 to another device.

Each of the modules illustrated in FIG. 3A or a portion thereof can be implemented in software suitable for execution on a processor and storage in a computer-usable medium, hardware, firmware or any combination of these.

FIG. 3B is a functional block diagram of a system for spontaneous sharing of a media asset reference from the perspective of a recipient device in accordance with another embodiment of the present invention. In this example, the recipient device is depicted as mobile device B as describe in FIG. 1 that is also a media player of the same kind as mobile device A. In this embodiment, the media management module 304 includes a media asset reference resolution software agent 316 for resolving the network resolvable identifier for the media service (e.g., 10) responsive to user input from the user interface module 308 accessing the reference. The media management module 304 sends the reference to the media service and participates in purchasing protocol based on the reference with the media service (e.g., with purchasing protocol module 206) via the network interface 314. Responsive to a successful purchase, the media management module 304 receives the purchased media asset and a media asset reference identifying the recipient user which it stores in the storage module 306 which can be played under the control of the media player 302 as indicated by user input from the user interface module 308.

Each of the modules illustrated in FIG. 3B or a portion thereof can be implemented in software suitable for execution on a processor and storage in a computer-usable medium, hardware, firmware or any combination of these.

Figure 4:
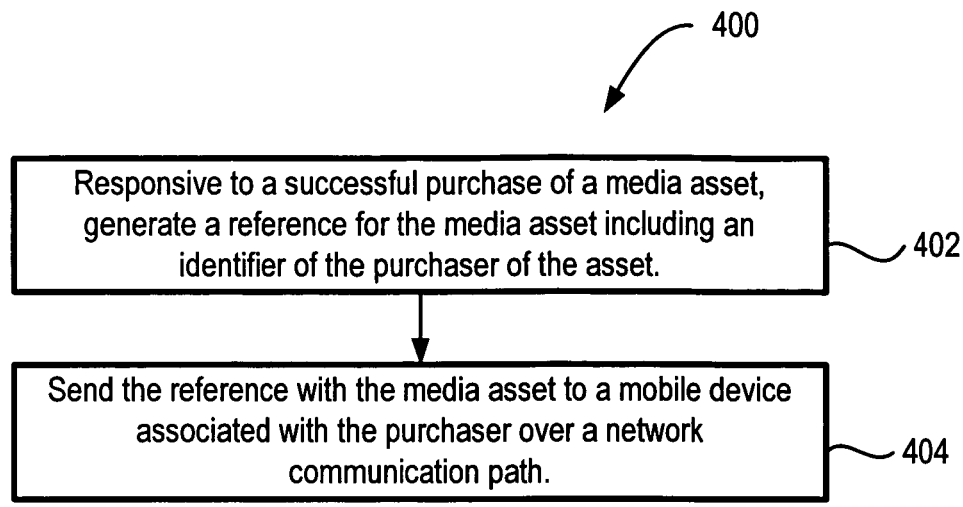
FIG. 4 is a flow diagram of a computer-implemented method for managing a media asset reference from the perspective of a media service receiving a request for a media asset not including a media asset reference in accordance with another embodiment of the present invention.

FIG. 4 is a flow diagram of a computer-implemented method 400 for managing a media asset reference from the perspective of a media service receiving a request for a media asset not including a media asset reference in accordance with another embodiment of the present invention. For illustrative purposes only and not to be limiting thereof, the method embodiment 400 of FIG. 4 is discussed in the context of the system embodiment of FIG. 2. Responsive to a successful purchase of a media asset, the reference generator module 204 generates 402 a reference for the media asset including an identifier of the purchaser of the asset. The media asset manager module 202 sends 404 the reference with the media asset to a mobile device associated with the purchaser over a network communication path.

Figure 5:
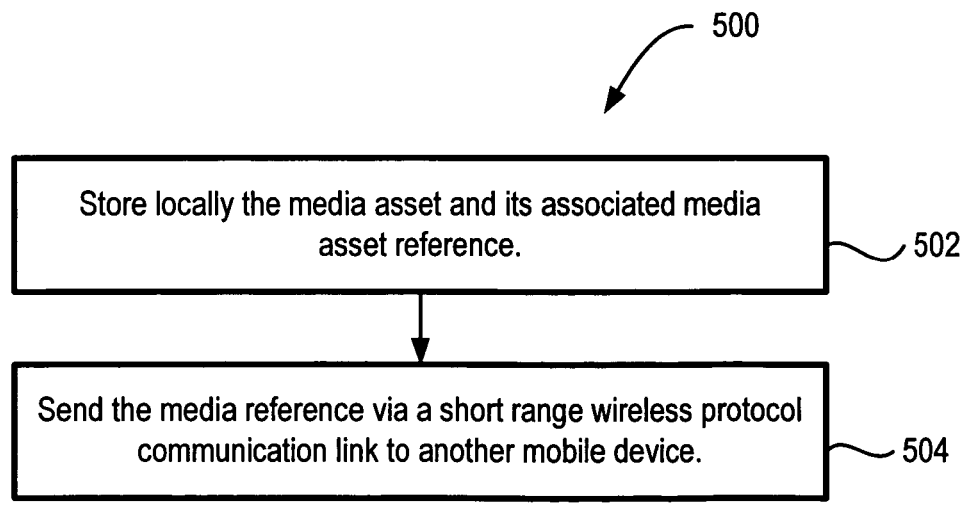
FIG. 5 is a flow diagram of a computer-implemented method for spontaneous sharing of a media asset reference from the perspective of a sharer device in accordance with another embodiment of the present invention.

FIG. 5 is a flow diagram of a computer-implemented method for spontaneous sharing of a media asset reference from the perspective of a sharer device in accordance with another embodiment of the present invention. For illustrative purposes only and not to be limiting thereof, the method embodiment 500 of FIG. 5 is discussed in the context of the system embodiment of FIG. 3A. The media management module 304 stores 502 locally the media asset and its associated media asset reference, for example in storage module 306, and sends 504 the media reference via a short range wireless protocol communication link to another device, for example, another mobile device.

Figure 6:
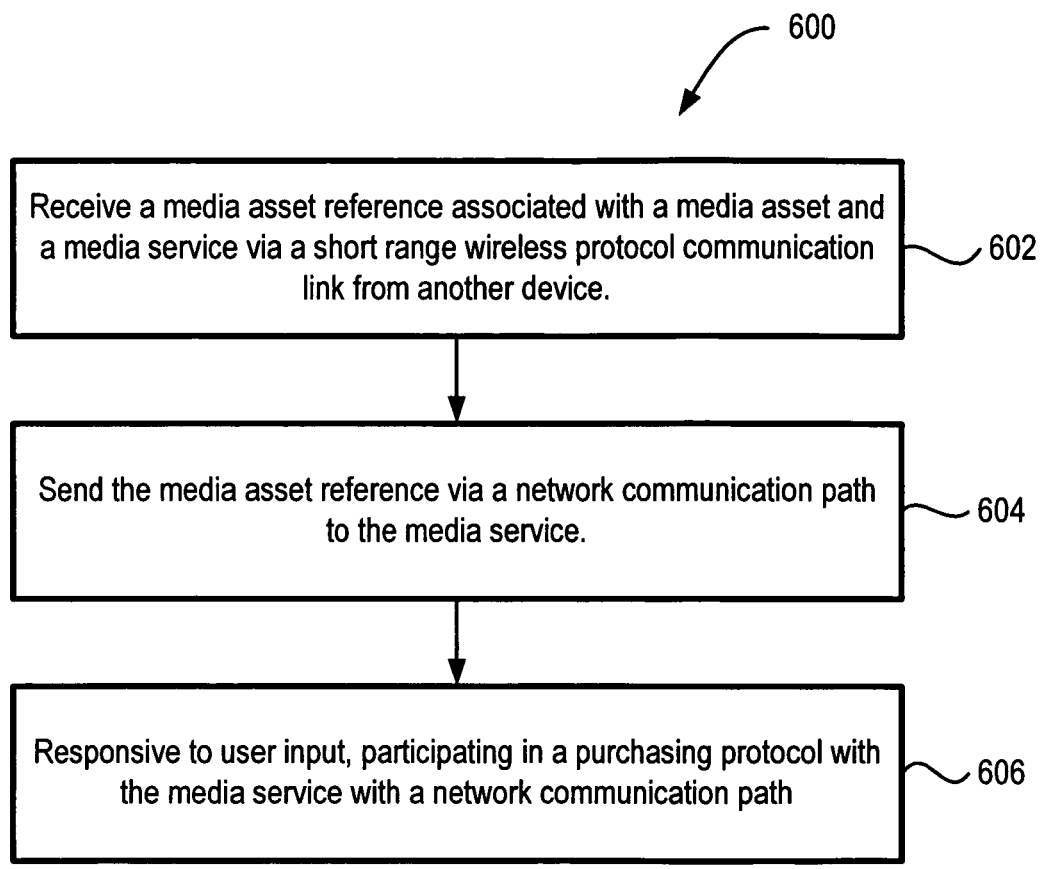
FIG. 6 is a flow diagram of a computer-implemented method for spontaneous sharing of a media asset reference from the perspective of a recipient device in accordance with another embodiment of the present invention.

FIG. 6 is a flow diagram of a computer-implemented method 600 for spontaneous sharing of a media asset reference from the perspective of a recipient device in accordance with another embodiment of the present invention. For illustrative purposes only and not to be limiting thereof, the method embodiment 600 of FIG. 6 is discussed in the context of the system embodiment of FIG. 3B. The media management module 304 receives 602 a media asset reference associated with a media asset and a media service via a short range wireless protocol communication link from another device. The media management module 304 sends 604 the media asset reference via a network communication path, for example over the Internet, via the network interface 314, to the media service. As in the example of FIG. 1, the recipient device 20 may not have Internet access at the time of transfer of the reference so the media module 304 may delay sending the reference to the media service until an Internet communication path is set up. Similarly, the device transferring the reference may be incapable of Internet access, for example a personal digital assistant without a network connection but having an IR port, can still transfer a reference to the recipient device. Responsive to user input, the media management module 304 participates 606 in a purchasing protocol with the media service over a network communication path.

Figure 7:
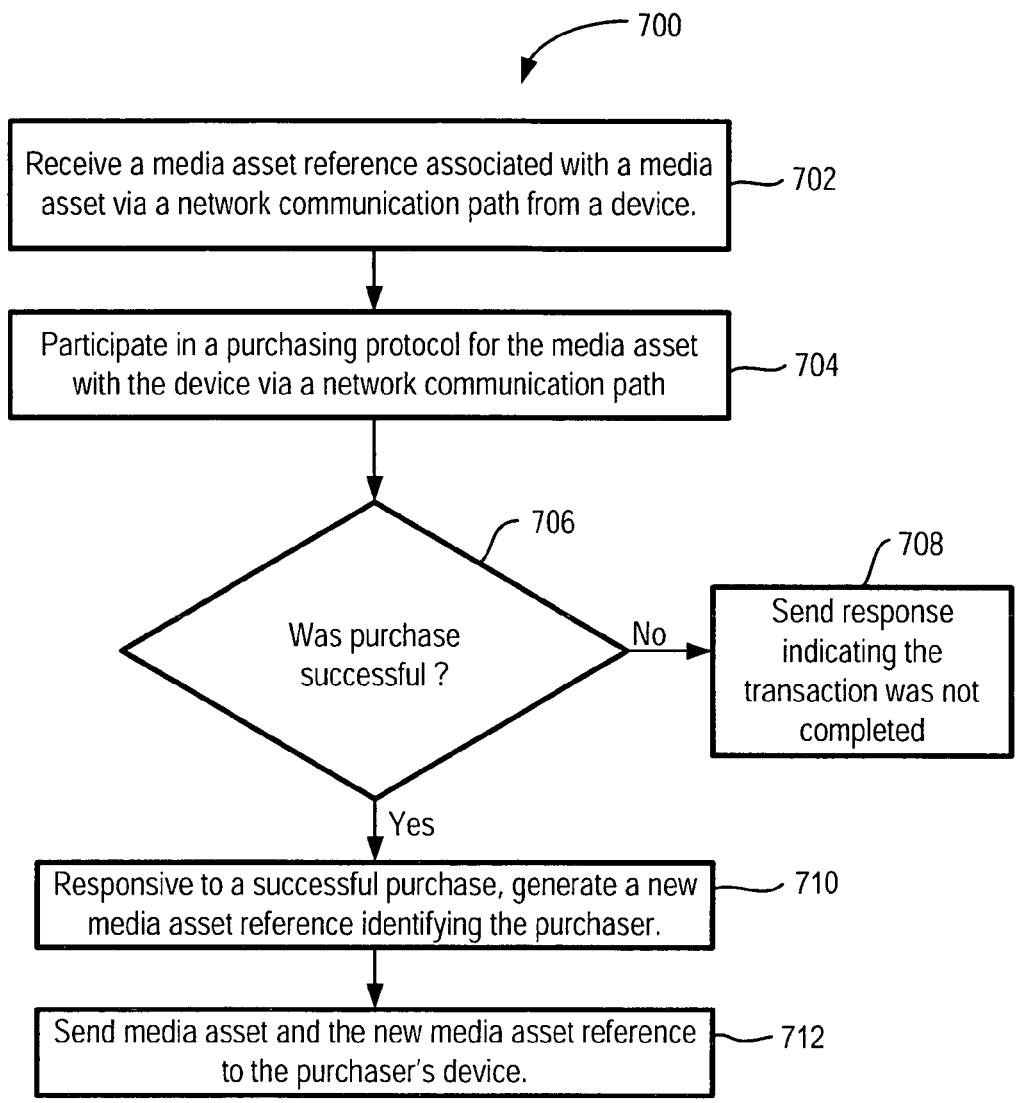
FIG. 7 is a flow diagram of a computer-implemented method for managing a media asset reference from the perspective of a media service receiving a request for a media asset including a media asset reference in accordance with another embodiment of the present invention.

FIG. 7 is a flow diagram of a computer-implemented method 700 for managing a media asset reference from the perspective of a media service receiving a request for a media asset including a media asset reference in accordance with another embodiment of the present invention. For illustrative purposes only and not to be limiting thereof, the method embodiment 700 of FIG. 7 is discussed in the context of the system embodiment of FIG. 2. The media asset manager module 202 receives 702 a media asset reference associated with a media asset via a network communication path from a device. The purchasing protocol module 206 participates in a purchasing protocol for the media asset with the device via a network communication path. Responsive to determining 706 that the purchase was not successful, the purchasing protocol module 206 sends 708 a response indicating the transaction was not completed. Responsive to determining 706 that a successful purchase was completed, the reference generator module 204 generates 710 a new media asset reference identifying the purchaser, and the media asset manager module 202 sends 712 the media asset and the new media asset reference to the purchaser's device. In one embodiment the new media asset reference also includes an identifier of the sharer from whom the purchaser received the reference. In this way, the media service can provide awards to the sharer as well as the purchaser for subsequent shares of the purchaser in accordance with an incentive program.

One or more embodiments of the present invention can be applied in various contexts. For example, consider an example in a supermarket or other retailer which plays music. If customers like the songs played in a certain store, they may come there more often to shop. Often a customer likes a song being played and desires to have a copy of it. In the supermarket example, there can be a transceiver at a designated location, preferably easily identifiable to customers, in each aisle which transmits the media asset reference of the song currently being played under the control of the store's music system. The customer who likes the song can synchronize a device with a short range wireless protocol interface such as a Bluetooth device with the transceiver and download the reference. The recipient device need only be capable of receiving and storing the reference and does not require media storage or presentation capabilities. Once shopping is completed, if the store provided the recipient device, the customer can go to a computer kiosk system in the store, for example a personal computer networked to the store's music computer system and the Internet, synch up the short range communication device and retrieve a removable storage medium such as a card with a magnetic strip, a memory stick or a diskette with the reference stored which can be inserted in another computer system with Internet access. Alternatively, the user can synch up and purchase a copy of the song from the media service using the reference on a kiosk that provides a removable storage medium such as a compact disc or memory stick with the requested song. Depending on the sophistication desired in the kiosk design, the kiosk can also be used to purchase and download the media asset onto media player devices such as MP-3 players and iPods®. In another example, the customer can insert a removable storage medium such as a magnetic strip card or a memory stick as the reference recipient into a media writer connected to the store's music system for retrieval of the media asset reference which can also be inserted into the kiosk computer system for purchase of a copy of the asset on a removable storage medium. The store in addition to attracting and retaining customers can also receive incentive awards based on the transactions from the media service which provides the store's music selection. Additionally, the customer can receive incentive awards when he shares the media asset reference.

As illustrated by the discussion above, one or more embodiments of the present invention provide benefits such as removing a manual search process for media assets, maintaining loyalty to the original media service, expanding product marketing for the media service and can support incentive based sharing schemes.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer system for spontaneous sharing of a media asset reference for a sharer device comprising:
   a processor; and
   memory, wherein said memory comprises executable instructions stored therein that when executed by said processor cause the processor to:
   receive a media asset from a media service at said sharer device, wherein said sharer device is a handheld mobile device;
   communicatively couple a communication interface;
   transfer a media asset reference for a media asset, without the media asset, by said sharer device to a recipient, wherein said sharer device does not transfer said media asset to said recipient, wherein said recipient is a handheld mobile device;
   and store the media asset reference at said sharer device, wherein the media asset reference comprises a network resolvable identifier for the media service from which a sharer purchased the media asset, an identifier for the sharer of the reference and an identifier for the media asset for tracking by the media service, wherein said media asset reference enables said recipient to request said media asset in its entirety directly from said media service.

2. The computer system of claim 1 wherein the media asset reference further includes a shorter sample version of the media asset.

3. The computer system of claim 1 wherein the communication interface includes a short range wireless protocol interface for transferring the media asset to the recipient.

4. The computer system of claim 1 wherein the recipient comprises a removable storage medium.

5. The computer system of claim 1 wherein the communication interface includes a short range wireless protocol interface for receiving the media asset by the recipient.

6. A computer-implemented method for spontaneous sharing of a media asset reference for a sharer device comprising:
   storing locally at said sharer device a media asset and a media asset reference wherein the media asset reference comprises a network resolvable identifier for a media service from which a sharer associated with the sharer device purchased the media asset, an identifier for the media asset for tracking by the media service, and an identifier for the sharer of the reference and wherein said sharer device is a computer;
   and communicating by said sharer device the media asset reference, without the media asset, to a recipient, wherein said sharer device does not transmit said media asset from a media service to said recipient, and wherein said sharer device is a handheld mobile device and said recipient is a handheld mobile device, wherein said media asset reference enables said recipient to request said media asset in its entirety directly from said media service.

7. The computer-implemented method of claim 6 wherein communicating the media asset reference to a recipient further comprises communicating the media asset reference via a short range wireless protocol to the recipient.

8. The computer-implemented method of claim 6 wherein the recipient comprises a removable storage medium.

9. A computer readable storage medium comprising instructions for causing a processor to execute a method for spontaneous sharing of a media asset reference for a sharer device, the method comprising storing locally a media asset and a media asset reference wherein the media asset reference comprises a network resolvable identifier for a media service from which a sharer associated with the sharer device purchased the media asset, an identifier for the media asset for tracking by the media service, and an identifier for the sharer of the reference; and communicating the media asset reference, without the media asset, to a recipient via a short range wireless protocol to the recipient by said sharer device, wherein said sharer device does not transmit said media asset from a media service to said recipient, and wherein said sharer device is a handheld mobile device and said recipient is a handheld mobile device, wherein said media asset reference enables said recipient to request said media asset in its entirety directly from said media service.

10. A computer-implemented method comprising:
receiving a media asset from a media service at a first mobile device;
transmitting, from said first mobile device to a second mobile device, a sample version of said media asset without transmitting an entirety of said media asset to said second mobile device, said sample version of said media asset being a segment of less than said entirety of said media asset; and
transmitting a media asset reference from said first mobile device to said second mobile device, wherein said media asset reference comprises an encrypted media asset identifier for tracking by said media service, an identifier for a user of said first mobile device, and a network resolvable identifier for said media service, wherein said media asset reference enables said second mobile device to request said media asset in its entirety directly from said media service.

* * * * *